US006597080B2

(12) United States Patent  (10) Patent No.: US 6,597,080 B2
Soderberg                   (45) Date of Patent:     Jul. 22, 2003

(54) METHOD OF MANUFACTURING A ROTARY ELECTRIC MACHINE AND A ROTARY ELECTRIC MACHINE

(75) Inventor: Christer Soderberg, Vasteras (SE)

(73) Assignee: ABB AB, Vasteras (SE)

( * ) Notice: Subject to any disclaimer, the term of this patent is extended or adjusted under 35 U.S.C. 154(b) by 0 days.

(21) Appl. No.: 09/842,277

(22) Filed: Apr. 26, 2001

(65) Prior Publication Data

US 2002/0053852 A1 May 9, 2002

(30) Foreign Application Priority Data

Apr. 26, 2000 (SE) ............................................. 0001501

(51) Int. Cl.[7] .............................................. H01R 39/04
(52) U.S. Cl. ......................................... 310/224; 29/596
(58) Field of Search ................................ 310/186, 216, 310/224, 270; 29/596

(56) References Cited

U.S. PATENT DOCUMENTS

| 1,053,680 | A | * | 2/1913 | Torda | 310/224 |
| 3,761,754 | A | | 9/1973 | Boesel | 310/218 |
| 3,885,302 | A | * | 5/1975 | Boesel | 29/596 |
| 3,955,271 | A | | 5/1976 | Boesel | 29/596 |
| 4,058,746 | A | * | 11/1977 | Mole et al. | 310/10 |
| 4,363,987 | A | * | 12/1982 | Vorotyntseva et al. | 310/216 |
| 4,435,664 | A | * | 3/1984 | Boesel | 310/186 |
| 4,751,415 | A | * | 6/1988 | Kitamori et al. | 310/156.01 |
| 6,339,870 | B1 | * | 1/2002 | Maruyama et al. | 29/596 |

FOREIGN PATENT DOCUMENTS

| CH | 577 764 | | 2/1975 | |
| DE | 2 240 798 | | 8/1972 | |
| DE | 2407699 | A * | 8/1975 | |
| FR | 2 937 740 | | 2/1979 | |
| JP | 54155408 | A * | 12/1979 | H02K/23/22 |

* cited by examiner

Primary Examiner—Joseph Waks
(74) Attorney, Agent, or Firm—Dykema Gossett PLLC

(57) ABSTRACT

The invention relates to a process for producing a rotating electric DC machine, where the main pole of the machine and the slots formed in it for the compensating winding are formed or placed in such a way that the slots are moved radially outward from the center of the stator to provide for an optimal increase in rotor diameter. In accordance with the invention, space is provided for the compensating winding to leave the slots in the main pole by making coil ends (4A) on the main coil (4) of the respective main pole tapered in the radially outward direction. In another alternative or complementary embodiment of the invention, additional space is created for the compensating winding where it leaves the slots by angling the coil ends (4A') of the main coil radially outward.

34 Claims, 7 Drawing Sheets

METHOD OF MANUFACTURING A ROTARY ELECTRIC MACHINE AND A ROTARY ELECTRIC MACHINE

TECHNICAL FIELD

This invention relates to the field of rotating electric machines in general and, in particular, to a process for manufacturing a rotating electric DC machine, as specified in the preamble to claim 1, which is attached.

BACKGROUND

Rotating electric DC machines with a rated output below ca. 350 kW are generally designed to be uncompensated. This means that the stator of the DC motor is provided only with main poles for magnetization and commutating poles. It is the task of the commutating poles to make sure commutation occurs without harmful sparking at the edges of the brushes, since harmful spark formation results in high maintenance requirements due to abnormal wear on the brushes and commutator.

In most cases, DC motors with a rated output above ca. 350 kW are designed with compensating windings. This means that, in addition to the previously mentioned windings, the motor's stator is also provided with a compensating winding. The coils of the compensating winding are placed in winding slots in the main poles, so that each coil of the compensating winding fills the slots of two adjacent main pole halves.

The compensating winding greatly reduces the so-called armature reaction. Without the compensating winding, the armature reaction causes a distortion of the magnetic flux in the main pole that is dependent on the direction of rotation, causing a degradation in performance. The compensating winding provides numerous advantages over the uncompensated DC motor. Examples of this include the following: greater utilization, i.e. a higher torque for a given rotor diameter; higher overload capacity; lower moment of inertia with otherwise identical performance; higher armature voltage and, thus, higher output power can be achieved because a higher mean lamination voltage is permissible without the risk of commutator sparking; better linearity between armature current and torque, which improves the possibility of regulating the load and rotational speed of the DC motor. The latter can be utilized, for example, to increase the so-called field-weakening region of the DC motor, i.e. the rpm range that is achieved by regulating the field circuit.

At the same time, however, the compensating winding creates a number of disadvantages, in the form of a cost increase of ca. 15–20% for the DC motor and reduced inductance, which leads to higher current ripple. This creates a higher noise level and, in certain cases, a DC motor that is more sensitive because of disturbances in the commutation process.

Customers' performance needs are such that a compensating winding provides the optimal solution:

in rare cases, at powers under 350 kW;
in ca. 30% of the DC motors in the power range of 350–500 kW;
in ca. 50% of the DC motors in the power range of 500–1,000 kW;
in ca. 70% of the DC motors in the power range of 1,000–1,500 kW;
in practically all DC motors in the power range above 1,500 kW.

Because of the higher cost of compensating windings and the fact that it is not actually needed in many applications, DC motor manufacturers prefer to make DC motors with a variable design: uncompensated or with a compensating winding, depending on customer needs. This has been unprofitable with the conventional technology available, however, since the two design principles require significantly different rotor diameters for a given stator size. The space required by the compensating winding limits the rotor diameter for a given stator size.

With the solutions available using conventional technology, the compensating winding design determines the rotor diameter, if the idea is for the basic design to make possible both alternatives—uncompensated and compensated winding—in a single motor size (with the same center height). As a result, the rotor diameter in the uncompensated alternative is smaller than it could be if the motor were designed exclusively as uncompensated. The reduction is such that in approximately half the cases the performance can be achieved with a motor size smaller than the motor in an exclusively uncompensated design, which results in a more cost-effective solution, i.e. lower price/performance. For economic reasons, the limitations of conventional technology make it impossible to produce DC motors of the same motor size using alternative solutions: uncompensated and with compensating winding, respectively. In principle, this means that two totally different motors must be constructed for the two designs, with the accompanying tool costs and an increased number of versions to administer and to stock parts for. Thus, in practice, most DC motor manufacturers choose to make their motors exclusively uncompensated or compensated for a certain motor size.

The technical limitations of conventional technology result in costly compromises, both for motor manufacturers and for customers. The motors may be uncompensated, which results in unnecessarily large and expensive motors for handling high overloads, for example.

Uncompensated DC motors also have an unfavorable relationship between moment of inertia and performance, which means the motor must be overdimensioned for some applications. The alternative with compensating winding means that unnecessarily expensive motors are used in a large number of applications in which the performance requirements are modest. Due to the limitation of conventional technology described above, most DC motors over ca. 350 kW, regardless of the manufacturer, are made with compensating winding.

Considering the statements above, it is clear that no economically feasible solutions are available for creating the basic design of DC machines in such a way that, depending on the customer's needs, the same machine size can be made either as uncompensated or compensated. Consequently, there is a great need to find an economically favorable solution that would make it possible, as needed, for machines of a certain size to be made as uncompensated or compensated, with no significant limitation on the rotor diameter and, thus, on the performance of either type of machine.

DESCRIPTION OF THE INVENTION

The invention eliminates the problems indicated above in an effective and suitable manner.

One general object of the invention is to bring about a solution to the problem of creating a rotating electric DC machine of a certain size, so that it can be produced at a reasonable cost for both an uncompensated design and with compensating winding.

Based on the considerations above, it is a basic object of the invention to find a simple means of additionally improving the power output of a compensated rotating electric DC motor of a certain size, i.e. with a certain center height, and, more specifically, to accomplish this using a method that, at an acceptable cost, will make it possible for a machine of the specified size to be made with an uncompensated design, with a rotor diameter that is maximal from the standpoint of its technical dimensioning, and with a compensated design, with just as large a rotor diameter as the uncompensated version.

In accordance with the invention, a process is made available for producing a rotating electric DC machine of the above-mentioned kind with which it will be practically possible to move the slots in the main pole of the machine for the compensating winding radially outward from the center of the stator to permit the optimal increase in rotor diameter. This is achieved by making the coil ends of the main coil taper radially outward. Thus, space is created in an advantageous manner for the compensating winding in the displaced slots, at the point where the compensating winding comes out of the winding slot. In another alternative or supplemental embodiment in accordance with this invention, additional space is made for the compensating winding where it comes out of the slots by angling the coil ends of the main coil radially outward.

In accordance with one embodiment of the invention, the outer turns in the coil ends are wound with a greater length than the inner turns in them. This produces the tapered shape in the coil ends in an advantageous manner.

In accordance with yet another embodiment of the invention, the coil ends of the compensating winding are angled radially outward outside the winding slots. In this way, it comes radially outside of the main coil, right at the outlet from the winding slots.

In accordance with another embodiment of the invention, the winding slots for the compensating winding in the main pole are shifted radially outward, so that they lie either mainly or completely radially outside those parts of the long sides of the main coil that are closest to the center of the stator.

In accordance with another embodiment of the invention, all the winding slots for the compensating winding are placed in the pole leg, namely such that all parts of the outer contour of the main pole's pole leg lie outside a sector defined by the shaft center of the stator and the outer corners of the outermost winding slots in a main pole. In this way, the winding slots and the compensating windings placed in them place virtually no limits on the rotor diameter, neither by the direct risk of collision with the main coil nor by taking up room in the stator that is smaller in general due to a larger rotor.

By making the main poles in this way, it is possible in practice to eliminate the winding slots that are located closest to the main pole horns in a conventional stator. This reduces the degree of compensation, to be sure, but the reduced degree of compensation is offset more than sufficiently by the improved degree of utilization that is achieved by the increased rotor diameter provided by the present invention and by the noticeably reduced manufacturing cost of a compensated DC machine of a certain machine size. In this context, improved utilization generally means increased power output and torque relative to the machine size, i.e. the center height.

Another object of the invention is to provide a rotating electric DC machine with a compensating winding whose coils and the winding slots in them, with their compensating winding, are placed in accordance with the basic principles of the invention. Embodiments of this aspect of the invention are presented in the corresponding dependent claims.

An additional object is to provide a process for producing a stator for a DC machine in accordance with the basic principles of the invention. Embodiments of this aspect of the invention are presented in the corresponding dependent claims.

Another object of the invention is to provide a stator for a DC machine that is designed in accordance with the invention's basic principles. Embodiments of this are presented in the corresponding dependent claims.

These and other objects of the invention are achieved by the invention as it is defined in the accompanying claims.

Another aspect of the invention relates to a use of a stator designed in accordance with the invention in an uncompensated DC machine. Such a use provides significant advantages, from the standpoint of standardization.

Additional aspects of the invention relate to a use of a stator designed in accordance with the invention in a motor or in a generator.

In summary, the present invention provides the following advantages over the conventional prior technology.

DC motors over ca. 350 kW, i.e. motors that with conventional design are normally compensated, can be make either uncompensated or compensated, with the same stator size.

In principle, the same stator laminations can be used to build stators in uncompensated and compensated machines of the same machine size which, in turn, allows Savings in the manufacturing process which, in the power range of 350–1,000 kW, means cost savings of ca. 10% of the DC motor's manufacturing costs, since the cheapest solution can be selected for each individual order, based on the customer's requirements.

The payoff time is extremely short for the added investment costs needed to be able to make DC machines compensated or uncompensated, as the case requires. This means considerably greater future income and increased profit potential.

Increased rotor diameter and, thus, a significant increase in performance; the rated torque and rated power are increased by ca. 10% in compensated DC motors.

Other objects, specific features, and advantages of the invention are made clear by the dependent claims and by the description of the sample embodiments below.

DESCRIPTION OF THE FIGURES

The invention will now be described in greater detail with the help of the accompanying drawings, whereby.

DESCRIPTION OF EMBODIMENTS

Figure 1:
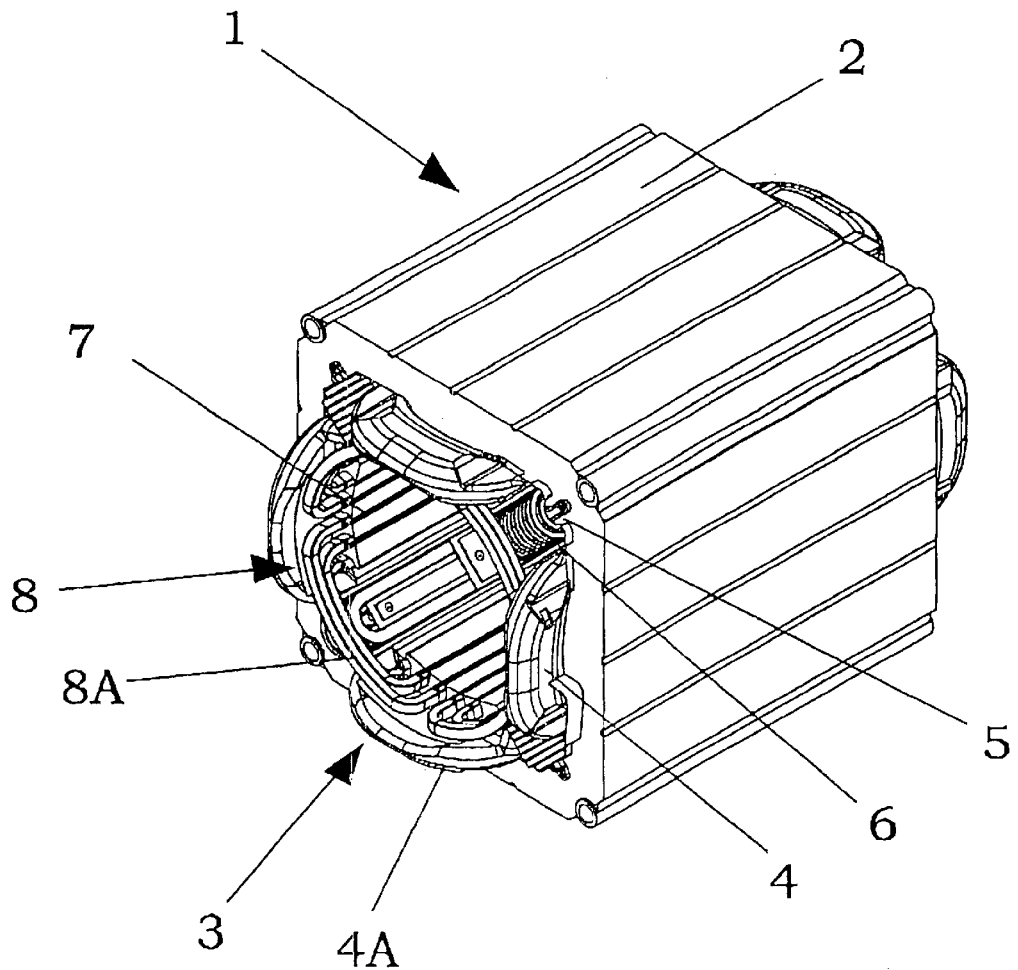
FIG. 1 is a perspective view of an embodiment of a stator for a rotating electric DC machine in accordance with this invention.

With reference to the figures in the drawings, the basic principles of the invention will now be described with the help of currently preferred embodiments of its various aspects, thereby clarifying the differences between it and conventional designs.

Figure 2:
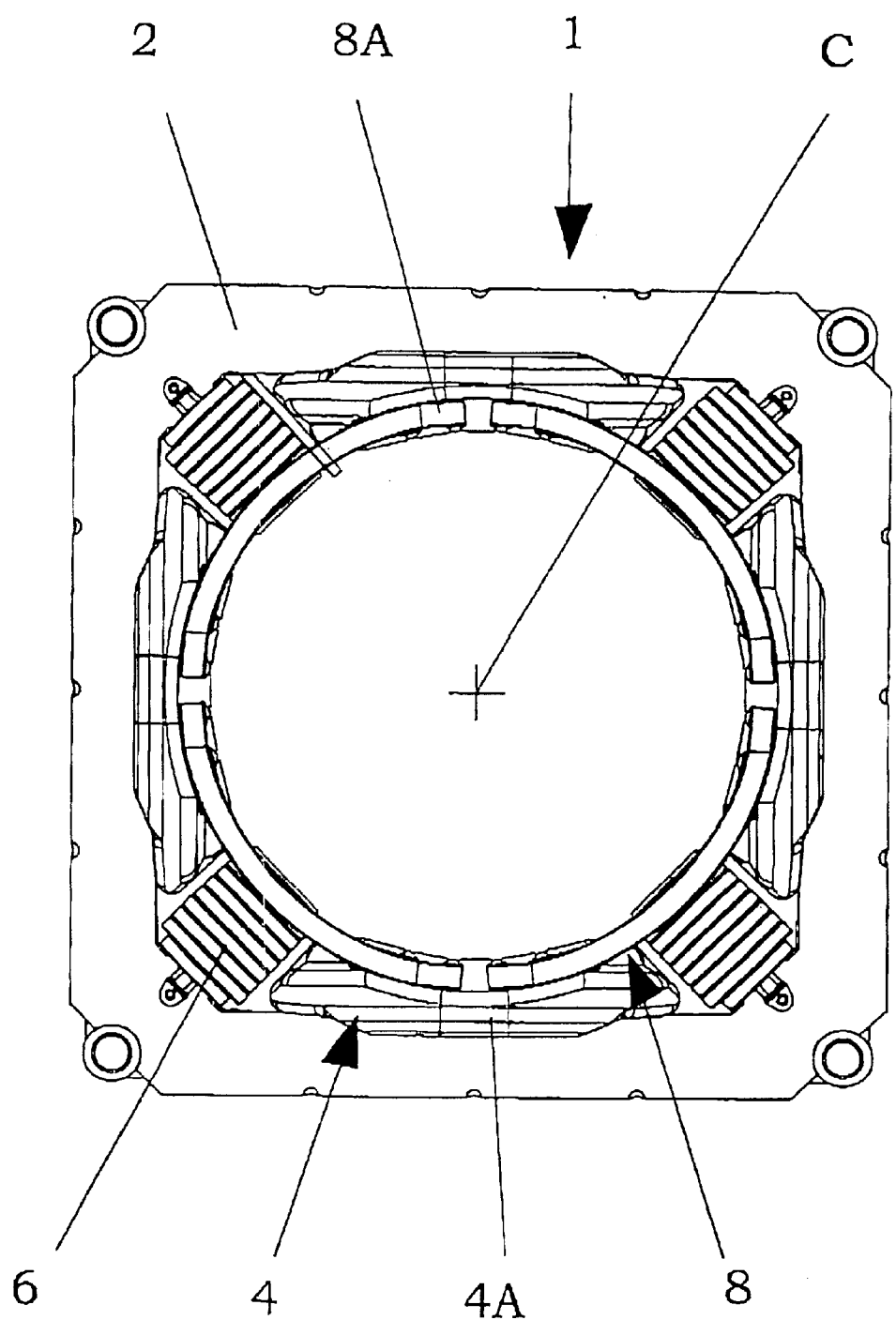
FIG. 2 is an end view of the stator in FIG. 1.

Thus, FIGS. 1 and 2 show a perspective view and an end view, respectively, of a stator 1 for a rotating electric DC machine, the rest of which is not shown, of the general type to which this invention is applicable and which can be used for both motor operation and generator operation. FIGS. 1 and 2 show a 4-pole stator, but it is obvious that the invention can just as well be used in machines with other numbers of poles.

Figure 4:
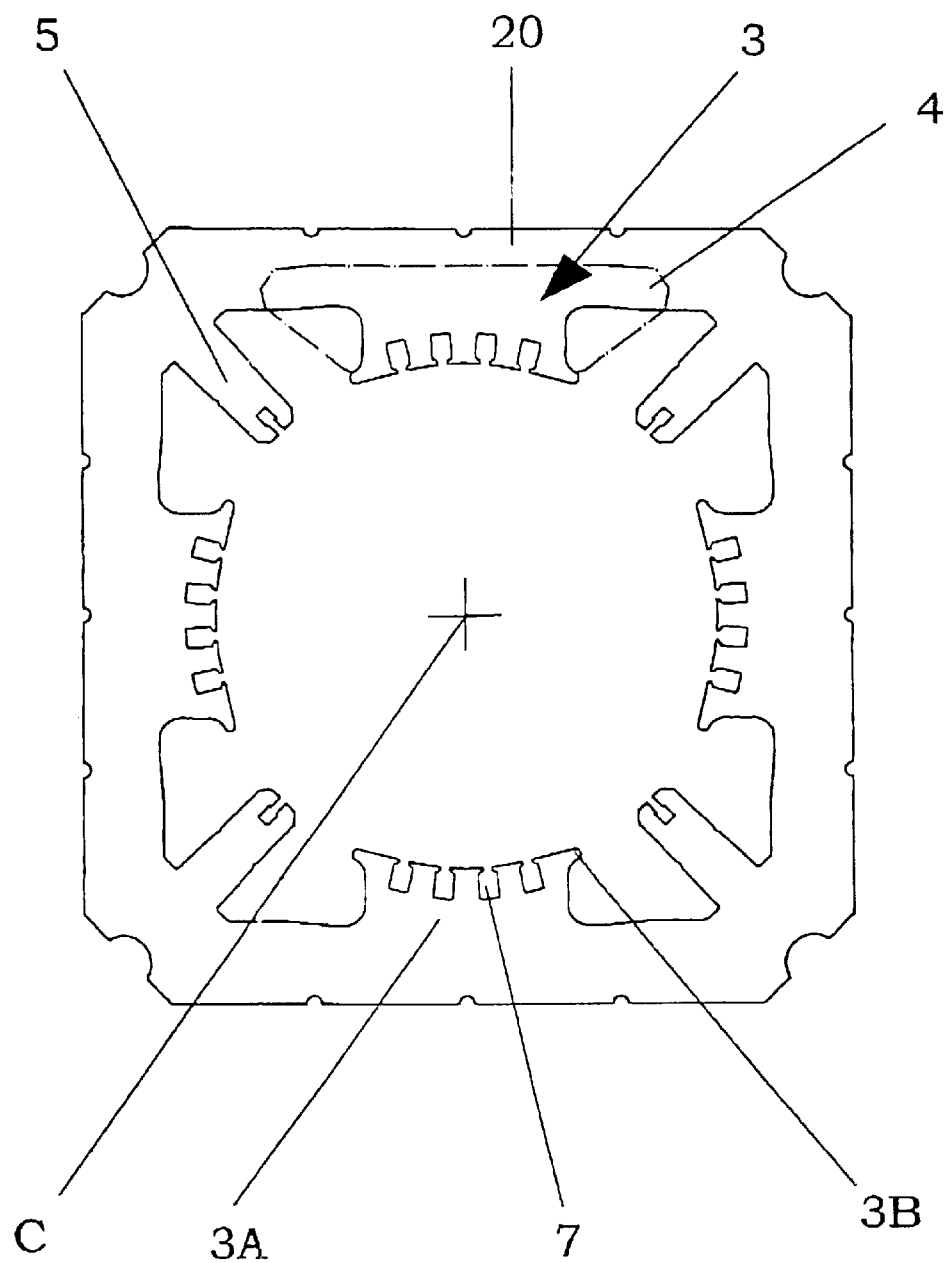
FIG. 4 shows an embodiment of a stator lamination in a stator made in accordance with this invention.

Stator 1 shown consists basically of a stator ring 2 made of stator laminations 20 (see FIG. 4). As indicated above, in the example shown here stator 1 is provided with four main poles 3 on which main or field windings 4 are placed. Commutating poles 5 are placed in the gaps between main poles 3. Each of these commutating poles is provided with a winding in the form of a commutating coil 6 and its task is to eliminate sparking at the DC machine's commutator, as described above.

A number of winding slots 7, located axially with respect to the longitudinal axis C of stator 1 and of the machine, are formed in each main pole 3, in the surface facing radially inward toward the central axis C of stator 1. A compensating winding 8 is placed in these winding slots 7. As indicated above, compensating winding 8 is placed in winding slots 7 in such a way that each one of its coils 8A lies in slots 7 in two adjacent main pole halves, as seen in FIG. 1 and as also indicated in FIG. 2.

Figure 3:
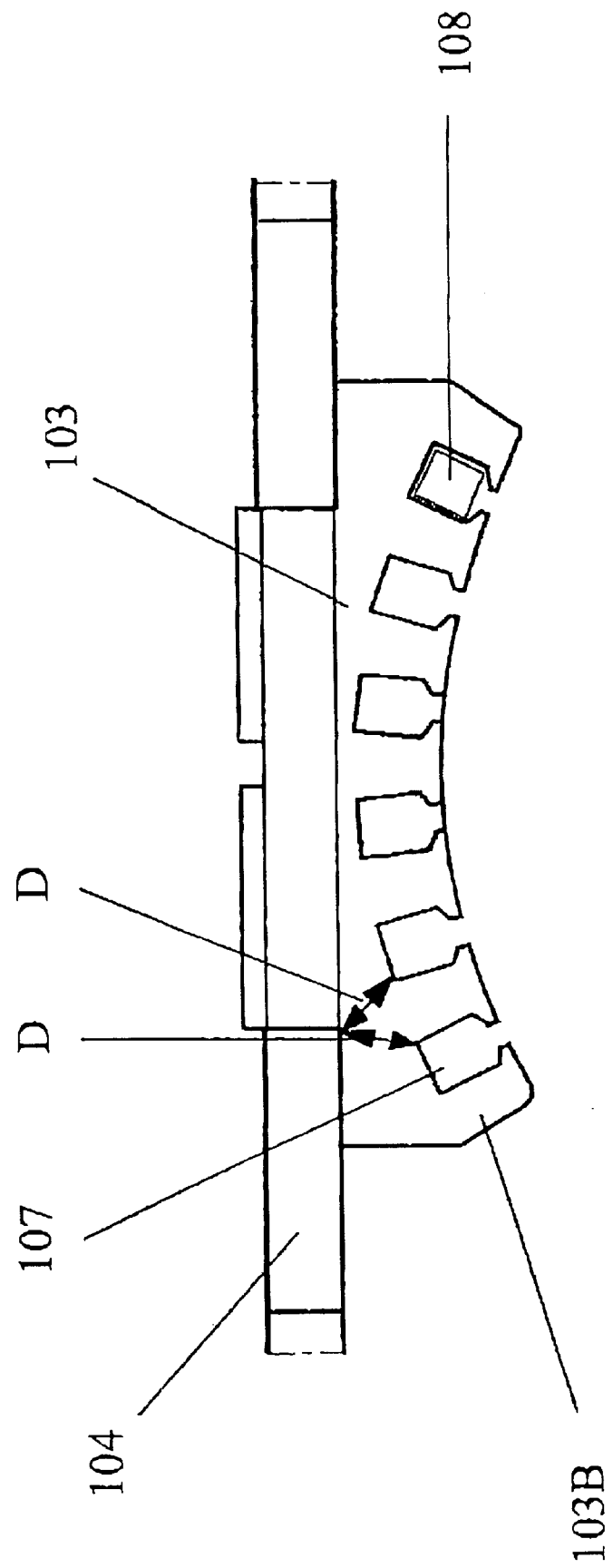
FIG. 3 is a schematic illustration of a detail of a main pole with main coil in a compensated stator of conventional design.

Thus far, the stator described here is similar to the conventional design. FIG. 3 shows a schematic cross section through a detail of a conventional stator in a compensated DC machine. Here, the outermost winding slots 107 in main pole 103 are placed in an area next to pole horns 103B, so that in the cross section the outermost winding slots 107 for compensating winding 108 lie radially directly inside main coil 104. In the figure, the distances required for the magnetic flux paths are drawn and are indicated by the letter D. Thus, the stator made in accordance with this conventional technology is characterized by the fact that, as seen from the central axis, the compensating winding lies radially completely or almost completely inside main coil 104. Having a larger rotor dimension in order to increase machine performance would, first of all, increase the rated current which, in turn, would cause the compensating winding to take up more space, since the dimensions of the copper winding must be increased. Secondly, the compensating winding would actually physically collide with the main coil.

The larger rotor diameter also reduces the overall space available in the conventional stator. After all, increased performance is also accompanied by an increase in the dimensions of the main coil and, at the same time, the stator ring must be thicker in order to handle the increased flux that the larger rotor diameter requires. Thus, all the parameters mentioned above require more space as the rotor diameter is increased. An increase in rotor diameter of just a few millimeters means that a relatively roomy stator is quickly filled entirely, making the passage of cooling air impossible.

Due to developments in DC motors, rotor diameters have increased constantly in existing stator sizes, in order to achieve cost-effective solutions, i.e. lower cost/performance. In the past 20 years, however, this trend has slowed considerably as the various designs have reached the limit set by the available space, as described above.

To solve these problems in accordance with this invention, winding slots 7 are basically placed in pole leg 3A of main pole 3 and, thus, the main poles are completely free of winding slots in the area radially outside pole horns 3B, as seen in FIG. 4. In this way, first of all, compensating winding 8 will not physically collide with the axial long sides of main pole 4, even if slots 7 are moved radially outward to provide room for a larger rotor in the machine. Secondly, the required distances for the magnetic flux paths are retained between main coil 4 and compensating winding 8, so that no flux-limiting restrictions occur, even when the dimensions of the copper windings increase as a result of an increased rotor diameter. In accordance with this invention, it is possible to locate such an increased winding copper dimension radially outward by increasing the depth of the winding slots.

More specifically, these advantages are achieved by a totally unique dimensioning and shaping of main poles 3 and slots 7 for compensating winding 8 located in them. This specific shape in accordance with the invention will now be defined with the help of the illustration in FIG. 5, which shows in detail parts of FIG. 4 discussed above and which is used here to illustrate the specifications indicated below.

According to the invention, each main pole 3 is made and slots 7 are placed in it such that two radii, $R_1$ and $R_2$ defined more specifically below, are always related by the relationship $R_1 > R_2$. Thus, $R_1$ is defined as the radius from the center C of stator 1 to a point of intersection between first and second lines CA and G. The first line, CA, is parallel to a line of symmetry S that passes through the center of the stator. In addition, it is tangent to main pole 3 at a point P on the latter that is located between main coil 4 on the pole and the center C of the stator at the greatest distance from the aforementioned line of symmetry. In other words, it may be said that point P defines the widest spot of main pole 3 at an outer side thereof. This point P need not necessarily be located on the actual pole horn 3B, but can lie radially outside it.

The other line G passes through an outer corner point R in the tangentially outermost slot 7 in the main pole and it is perpendicular to a third line CB that passes through the center of the stator and through the same outer corner point R. Outer corner point R refers here to the radially outer corner in each of the two tangentially outermost slots 7 in each main pole, located farthest away from a central plane through the main pole. This central plane coincides with the line of symmetry S shown in FIG. 5. Expressed differently, point R is always located in the slot sides that are tangentially farthest from each other in a main pole and in the corner along this slot side that is at the greatest distance from the center C of the stator. Further, R refers to the corner point formed if the radius at this corner is set to 0. It should be clarified here that in those parts of this description where definitions are given with reference only to relationships at one axial side of the main pole, they also apply in a similar manner to the opposite axial side, since it is assumed that the main pole is symmetrical about line of symmetry S.

Furthermore, $R_2$ is defined as the radius from the center C of stator 1 to a point of intersection between the first line CA mentioned above, which is parallel to the line of symmetry S through the center of the stator, and a fourth line F, which extends along surface AF of main pole 3, which forms the limit of main coil 4 closest to the center C of stator 1. Alternatively, if the above-mentioned surface AF is curved, then the fourth line F is the tangent to this surface AF at a point T, where the support of the main pole against the main coil ends, as seen in the direction toward the stator's center.

With this design and dimensioning, the magnetic flux paths are not disturbed, regardless of the radial placement of slots 7 in the main pole. At the same time, the required space is created for the main coil.

Figure 5:
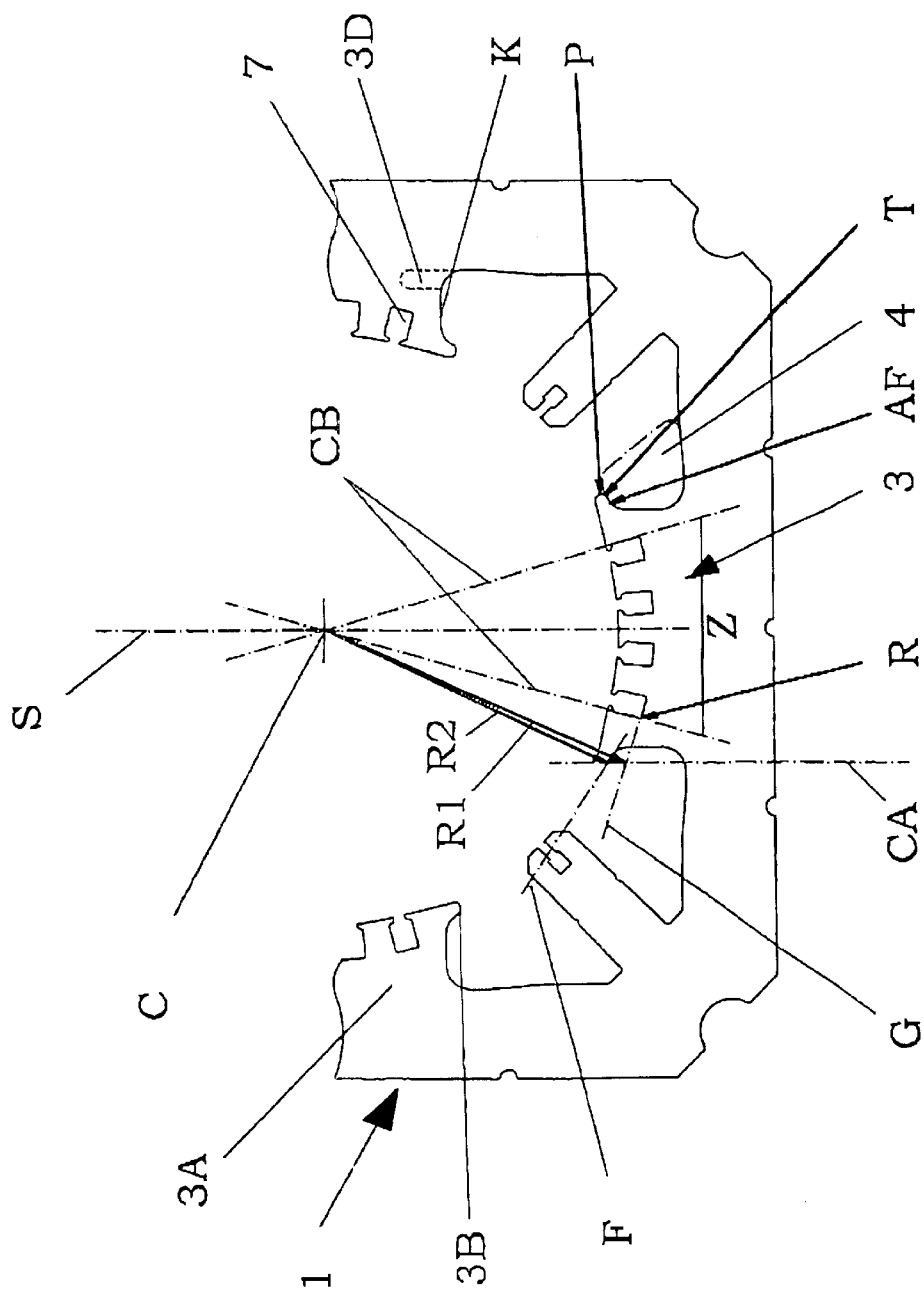
FIG. 5 shows the stator lamination of FIG. 3 in enlarged scale.

In accordance with a further development of the idea behind the invention, each main pole 3 is made and slots 7 are placed in it such that, as seen in a cross section through pole leg 3A, each point on the tangentially outermost contour lines K of pole leg 3A lie outside a sector Z that is formed by two of the above-mentioned third lines CB, which pass through the center C of stator 1 and through the outer corner points R in the two winding slots 7 in main pole 3 that are arranged on either side of line of symmetry S though the center of the stator and, viewed tangentially, are the outermost slots. With regard to the two outer contour lines K, it must be further clarified that these refer here only to those parts thereof against which parts of main coils 4 are placed. The cavities or slits 3D that are illustrated by the broken line in FIG. 5 are not considered here to belong to the contour line, since they are used as cooling channels or as a weakening to avoid an undesired natural frequency in the stator lamination package and never for locating part of the main pole.

With this further development of the invention, slots 7 for the compensating winding can be moved radially outward by the maximum amount in order to provide space for a maximum rotor diameter.

Of course, the degree of compensation can be reduced somewhat by the proposed placement of slots 7 of compensating winding 8. However, the reduced degree of compensation that results from the present invention in certain applications causes only a limited loss of moment/current linearity, compared to the best conventional designs. The ratio of overload moment to overload current is reduced by ca. 5%. Of course, this affects the maximum torque level at overload, but since the rated torque and rated power can be increased by ca. 10%, the net effect is that the overload moment increases by ca. 5%. Thus, the reduced degree of compensation and the accompanying moderate reduction in moment/current linearity are more than offset by the increase in rated torque and rated power achieved by the increased rotor diameter.

In this connection, it should be pointed out that the number of winding slots per se is of no importance to the invention and that its fundamental advantages are achieved exclusively by the proposed placement of the slots. Even though the embodiment of the invention shown in the drawings has main poles with a small number of winding slots than the conventionally designed main pole in FIG. 3, this is only a coincidence. In practice, the number of winding slots in accordance with this invention can vary freely within the physical limitations imposed by the placement specified above.

The significance of this design of the invention is most clearly indicated when it is compared to the conventional design discussed above in conjunction with FIG. 3, which places a direct limitation on the rotor diameter, since even a very small increase in the latter would mean that the copper winding dimensions would increase so much that the above-mentioned distance D of the magnetic flux paths could no longer be maintained.

With the design in accordance with this invention as described above, slots 7 for compensating winding 8 can also be moved radially so far outward from the center C of stator 1 that, even in the compensated form, the DC machine can be provided with the maximum rotor diameter for the machine size, from the standpoint of technical dimensioning. Furthermore, this means in practice that a DC machine of a given machine size can be made with just as large a rotor diameter in the compensated form as in the uncompensated form. This, in turn, brings significant manufacturing advantages, since stator laminations 20 for a DC motor can be made with the same basic measurements both for uncompensated and compensated designs. Consequently, in principle, the same punching machine can be used for both machine types. The chief difference is found only in the slots for the compensating winding, which can be produced in a separate punching operation with tools that cost only ca. 1/10 the cost of a punching tool for the complete punching of a special stator lamination for one type of machine. Purely in principle, it is also possible to make manufacturing even more efficient by utilizing stator laminations 20 with winding slots 7, but without compensating winding 8, even for a machine using the uncompensated design.

Using a so-called multistation tool, for example, the shape of the stator lamination segment can be varied somewhat between the uncompensated and the compensated designs, in order to optimize the shape of the main pol and the commutator pole, for example. The invention also includes such variants, assuming that the stators are used with rotors in which the rotor diameter is the same or virtually the same in both alternatives. Further, the invention includes stators made of complete punched stator laminations and segmented stators, i.e. stators made up of separate stator lamination segments.

Figure 6:
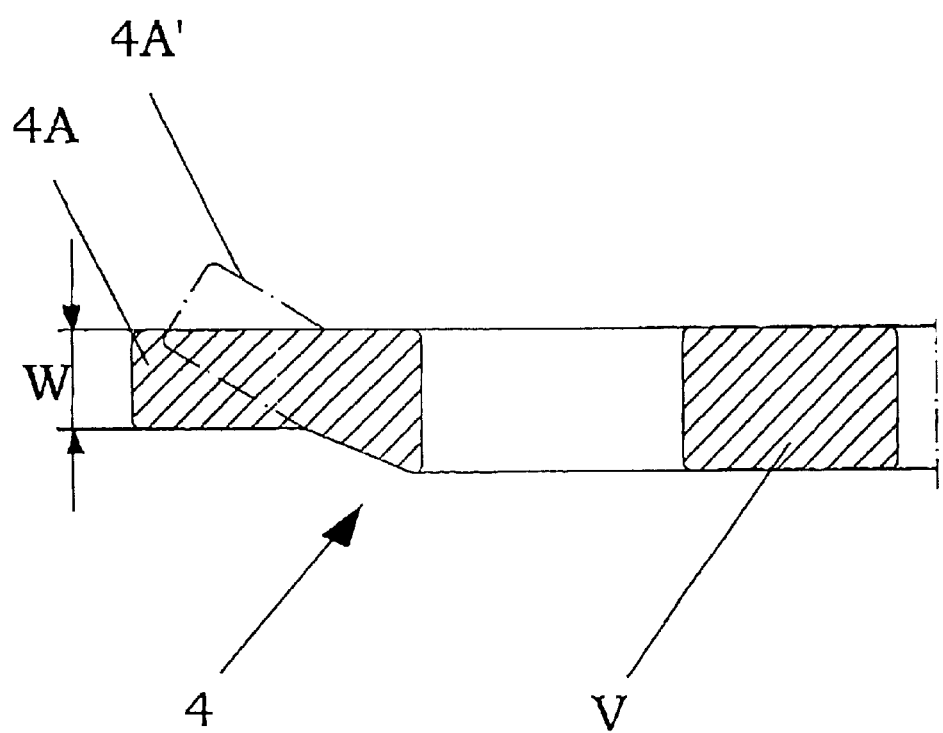
FIG. 6 shows a detail of the coil end design in an embodiment of a main coil in a stator made in accordance with this invention.

In accordance with the invention, it is also proposed that axial coil ends 4A of main coil 4 be made with a reduced radial thickness W relative to the over parts of the main coil (see, in particular, FIG. 6). In other words, they are made with an elongated shape, i.e. with a cross section that tapers outwardly in the axial direction. This design of the main coil makes it possible, in accordance with the invention, to move winding slots 7 for compensating winding 8 far outward from the center C of stator 1. More specifically, it allows the slots to be moved so that, as seen from the center of the stator, they lie in whole or in part outside the inner edge of the axially extended long sides of main coil 4, without having the compensating winding collide with axial coil ends 4A of main coil 4 when it leaves winding slots 7.

One currently preferred way to produce this tapered, extended shape is to wind main coil 4 so that the turns at the ends are longer than the minimum length that would be required if the main coil were made consistently, i.e. all around, with basically the same cross-sectional dimension (V) (see the illustrated cross section in FIG. 6, which is a long side of main coil 4. By making the turns of the coils successively longer the farther out radially in the spool end they are placed, coil end 4A is given a tapered shape that is angled radially outward. An alternative method is to physically bend or angle the coils radially outward at the end, as indicated schematically at 4A' in FIG. 6. Of course, the two methods described here can be used individually or in combination, as needed.

The measures described here provide the required space for compensating winding 8 to pass out of main pole 3 and past main coil 4 at a sufficient distance from the rotor. This design represents a considerable difference compared to the conventional DC motor, in which a large rotor diameter causes problems, since in this case the compensating winding is forced to pass so far radially out from the center axis that the winding slots come out directly under the end of the main coil. In this case, the two windings collide with each other.

Figure 7:
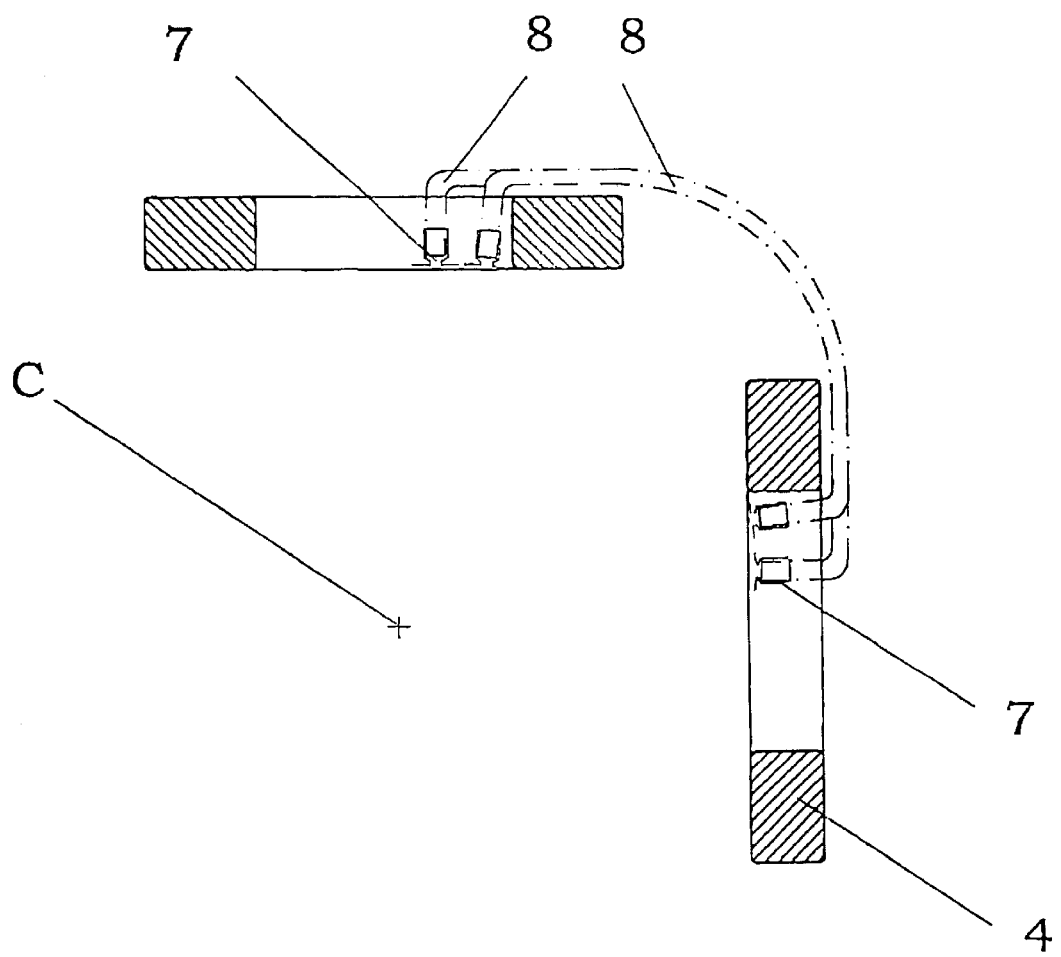
FIG. 7 is a basic diagram showing a detail of the winding of coil ends in an embodiment of a compensating winding in accordance with this invention.

According to an additional variant of the invention, illustrated in principle in FIG. 7, compensating winding 8 can be placed so that it is bent radially outward from the central axis C at the point where it leaves winding slots 7 in main pole 3. In this way, the coil ends of the winding are angled so that they are radially outside main coil 4, as seen from the central axis.

In summary, it is the basic object of this invention to produce an economically advantageous solution for improving the power output of a compensated electric DC motor. Overall, the measures described in the present invention can reduce the production cost/performance figure by 15 to 20%. This cost reduction is achieved in two stages. By accepting a lower degree of compensation, it is possible to make the manufacturing process more economical, thereby reducing production costs, on average, by ca. 10% of the total cost of the DC motor. In addition, this solution allows a larger rotor to be placed in a given stator. This increases performance dramatically, resulting in additional cost advantages.

Seen from another perspective, this means that DC motors over ca. 350 kW, i.e. motors that with a conventional design would ordinarily be compensated, can be made in accordance with the principles of this invention either as uncompensated or compensated. The cost comparison above makes it clear that the cost savings from the present invention will be quite significant, since the least expensive solution can be chosen for each individual order, based on the customer's needs.

At present the invention is believed to have its greatest application in motor operation, but the basic principles of the invention also include its use in generator operation.

Those skilled in the art can see that various modifications and changes can be made in the present invention without deviating from the framework of the invention, as defined in the accompanying patent claims.

What is claimed is:

1. A process for producing a rotating electric DC machine having a central axis, a stator and a rotor rotatably mounted in the stator, the stator having a number of main poles with respective main coils having long sides and axial coil ends, the main poles having slots parallel to the central axis, and a compensating winding disposed in the slots comprising the steps of:
  radially shifting the slots, outward so that at least parts of said slots are arranged radially outside radially inner parts of the long sides of the respective main coil, and
  forming the axial coil ends of the main coils with at least one of an outwardly tapered cross section and radially outwardly bent ends in the direction away from the central axis of the stator.

2. The process according to claim 1, wherein each coil has inner and outer turns and further comprising: winding the outer turns of the coil ends with a greater length than at the inner turns.

3. The process according to claim 1 comprising, placing the compensating winding so that portions of the winding external of the slots passes radially outside main coil.

4. The process according to claim 1, comprising: moving portions of the compensating winding radially outward, so that they are arranged radially outside radially inner portions parts of the long sides of the respective main coil.

5. The process according to claim 1, further comprising; forming each main pole and slots such that:

$R_1 > R_2$ where $R_1$ is defined as the radius from the center of stator to a point of intersection between a first line, which is parallel to a line of symmetry through the center of the stator and is tangent to main pole at a point thereon, which is located between main coil on the pole and the center of the stator and is at the greatest distance from said line of symmetry, and
a second line, which passes through an outer corner point in the slot of the main pole that is outermost as seen tangentially, said corner point being at the one of two radially outer corners of the slot located farthest from a center plane through the main pole and is perpendicular to a third line passing through the center of the stator and through the outer corner point, and
$R_2$ is defined as the radius from the center of stator to a point of intersection between the first line, which is parallel to the line of symmetry through the center of the stator, and a fourth line, which extends along surface of main pole, which forms a limit of the main coil closest to the center of stator and when said surface is curved, then the line is tangent to said surface at a point, where the support of the main pole against the main coil ends, as seen in the direction toward the center of the stator, so that the magnetic flux paths are not disturbed, regardless of the radial placement of slots in the main pole.

6. The process according to claim 5, further comprising, making each main pole and slots such that, as seen in a cross section through each pole leg, each point on outer contour lines of each pole leg lies outside a sector that is formed by a pair of third lines, which pass through the center of stator and through outer corner points in the two winding slots in the main pole that are arranged on either side of a line of symmetry though the center of the stator and that, viewed tangentially, are the outermost slots.

7. The process according to claim 1, further comprising: forming the stator of completely punched stator laminations.

8. The process according to claim 1, further comprising: forming the stator of separate stator lamination segments.

9. The process according to claim 8, wherein the stator is formed of completely punched stator laminations.

10. The process according to claim 1, further comprising: punching the winding slots in a separate stamping operation.

11. A rotating electric DC machine having a central axis and a rotor rotatably mounted in a stator, and wherein the stator has a number of main poles with respective main coils, whereby the main poles have slots parallel to the central axis and a compensating winding arranged in the slots, said compensating winding being shifted radially outward, so that at least portions thereof, and the compensating winding placed therein are arranged radially outside radially inner of the long sides of the respective main coils, wherein the axial coil ends have an outwardly tapering cross section, so that the axial coil ends have at least one of an extended shape that is at least one of radially thinner than that of other portions of the coil, and radially outwardly bents ends in the direction away from the center of stator.

12. The rotating electric DC machine according to claim 11, wherein in the coil ends have radially outer turns and radially inner turns and the radially outer turns, are wound with a length greater than the radially inner turns.

13. The rotating electric DC machine according to claim 11, wherein the compensating winding is located radially outward from the central axis at ends of the winding slots, so that said compensating winding is radially outside main coil.

14. The rotating electric DC machine according to claim 11, wherein the slots are shifted radially outward, so that they and portions of the compensating winding therein are arranged radially outside radially inner portions of the long sides of the respective main coil.

15. The rotating electric DC machine according to claim 11, wherein each main pole and slot, have dimensions such that:

$R_1 > R_2$, where $R_1$ is defined as the radius of the center of the stator to a point of intersection between
a first line, which is parallel to a line of symmetry through the center of the stator and is tangent to a point in the main pole located between the main coil on the pole and the center of the stator and is at the greatest distance from said line of symmetry, and a second line, which passes through an outer corner point in the slot of the main pole that is outermost as seen tangentially, said corner point being one of two radially outer corners of the slot that is located farthest from a center plane through the main pole and perpendicular to a third line passing through the center of the stator and through the outer corner point, and $R_2$ is defined as the radius from the center of stator to a point of intersection between the first line, which is parallel to the line of symmetry through the center of the stator, and a fourth line, which extends along surface of main pole, which forms the limit of main coil closest to the center of stator and, if said surface is curved, the line is the tangent to said surface at a point, where the support of the main pole against the main coil ends, as seen in the direction toward the center of the stator, whereby magnetic flux paths are not disturbed, regardless of the radial placement of slots in the main pole.

16. The rotating electric DC machine according to claim 15, wherein each main pole and slots are formed such that, as seen in a cross section through each pole leg, each point on outer contour lines of each pole leg lies outside a sector that is formed by a pair of third lines, which pass through the center of stator and through the outer corner points in the two winding slots in main pole arranged on either side of line of symmetry though the center of the stator and, viewed tangentially, are the outermost slots in main pole.

17. The rotating electric DC machine according to claim 11, comprising a motor.

18. The rotating electric DC machine according to claim 11, comprising a generator.

19. A process for producing a stator for a rotating electric DC motor having a central axis, whereby the stator is equipped with a number of main poles with respective main coils and the main poles are provided with slots, axially arranged with respect to the central axis of the machine, and a compensating winding for the slots, and the slots being radially shifted outward so that at least parts of the slots are arranged radially outside radially inner portions of the long sides of the respective main coil, wherein the axial coil ends of main coils are formed with an outwardly tapered cross section, whereby the coil ends have an extended shape that is at least one of radially thinner than other portions of the coil and the axial coil ends of main coils are bent radially outward in the direction away from the center of stator.

20. The process according to claim 19, wherein the coil ends have inner and outer turns, and the outer turns of the coil ends are wound with a greater length than the radially inner turns.

21. The process according to claim 19, wherein the compensating windings bends radially outward from the central axis near ends of the slots, so that it passes radially outside main coil.

22. The process according to claim 19, wherein the slots for the compensating winding are moved radially outward, so that they are arranged entirely or at least mainly radially outside radially inner parts of the axially extending long sides of the respective main coil.

23. The process according to claim 19, wherein each main pole and slots in it are made such that:

$R_1 > R_2$, where $R_1$, is defined as the radius from the center of stator to a point of intersection between a first line, which is parallel to a line of symmetry through the center of the stator and is tangent to a point in the main pole, located between the main coil on the pole and the center of the stator and is at the greatest distance from said line of symmetry, and a second line, which passes through an outer corner point in the slot of the main pole that is outermost as seen tangentially, said corner point being at the one of the two radially outer corners of the slot located farthest from a center plane through the main pole and perpendicular to a third line passing through the center of the stator and through the outer corner point, and $R_2$ is defined as the radius from the center of the stator to a point of intersection between the first line, which is parallel to the line of symmetry through the center of the stator, and a fourth line, which extends along surface of main pole, which forms the limit of main coil closest to the center of stator or alternatively, if said surface is curved, then line is the tangent to said surface at a point, where the support of the main pole against the main coil ends, as seen in the direction toward the center of the stator, whereby magnetic flux paths are not disturbed, regardless of the radial placement of slots in the main pole.

24. The process according to claim 22, wherein each main pole and slots therein are made such that, as seen in a cross section through the pole leg, each point on outer contour lines of the pole leg lie outside a sector that is formed by two third lines, which pass through the center of the stator and through the outer corner points in the two winding slots in the main pole that are arranged on either side of a line of symmetry though the center of the stator and outermost slots.

25. The process according to claim 19, wherein the stator is formed of separate stator lamination segments.

26. The process according to claim 18, wherein the winding slots for compensating winding are punched in stator laminations or the stator lamination segments in a separate stamping operation.

27. A stator for a rotating electric DC machine having a central axis with a number of main poles with respective main coils, the main poles being equipped with axial slots and with a compensating winding arranged in the slots, slots being shifted radially outward, so that at least parts thereof and compensating winding placed in them are arranged radially outside radially inner parts of the long sides of the respective main coils, wherein the axial coil ends of main coils have an outwardly tapering cross section, so that the coil ends are made with at least one of an extended shape that is radially thinner than other parts of the coil and the axial ends of main coils are bent radially outward in the direction away from the center of stator.

28. The stator according to claim 27, wherein in the coil has inner and outer turns and ends the radially outer turns are wound with a length greater than the radially inner turns.

29. The stator according to claim 27, wherein the compensating winding is placed so that it is bent radially outward from the central axis at the point where it leaves winding slots, so that it is radially outside main coil.

30. The stator according to claim 27, wherein the slots for the compensating winding are shifted radially outward, so that they and compensating winding therein are arranged at least mainly radially outside radially inner parts of the long sides of the respective main coil.

31. The stator according to claim 27, wherein each main pole and slots in it are formed such that:

$R > R_2$, where $R_1$ is defined as the radius from the center of stator to a point of intersection between a first line, which is parallel to a line of symmetry through the center of the stator and is tangent to each main pole at a point thereon, located between the main coil on the pole and the center of the stator and is at the greatest distance from said line of symmetry, and a second line, which passes through an outer corner point in the slot of the main pole that is outermost as seen tangentially, said corner point being at one of two radially outer corners of the slot located farthest from a center plane through the main pole and perpendicular to a third line passing through the center of the stator and through the outer corner point, and $R_2$ is defined as the radius from the center of stator to a point of intersection between the first line, which is parallel to the line of symmetry through the center of the stator, and a fourth line, which extends a along surface of main pole, which forms a limit of the main coil closest to the center of the stator and, if said surface is curved, then the line is tangent to said surface at a point, where the support of the main pole against the main coil ends, as seen in the direction toward the center of the stator, whereby magnetic flux paths are not disturbed, regardless of the radial placement of slots in the main pole.

32. The stator according to claim 31, wherein each main pole and slots therein are formed such that, as seen in a cross section through pole leg, each point on outer contour lines of pole leg lies outside a sector that is formed by two third lines, which pass through the center of stator and through the outer corner points in the two winding slots in main pole that are arranged on either side of line of symmetry though the center of the stator and, viewed tangentially, are the outermost slots in main pole.

33. The use of a stator in accordance with claim 27, wherein the machine comprises a motor.

34. The use of a stator in accordance with claim 27, wherein the machine comprises a generator.

* * * * *